United States Patent
Gasser

(10) Patent No.: US 10,106,459 B2
(45) Date of Patent: Oct. 23, 2018

(54) PROCESS AND DEVICE FOR CEMENT CLINKER PRODUCTION

(71) Applicant: Holcim Technology Ltd., Rapperswil-Jona (CH)

(72) Inventor: Urs Gasser, Rüfenach (CH)

(73) Assignee: HOLCIM TECHNOLOGY LTD, Rapperswil-Jona (CH)

( * ) Notice: Subject to any disclaimer, the term of this patent is extended or adjusted under 35 U.S.C. 154(b) by 289 days.

(21) Appl. No.: 14/784,331

(22) PCT Filed: Apr. 8, 2014

(86) PCT No.: PCT/IB2014/000500
§ 371 (c)(1),
(2) Date: Oct. 14, 2015

(87) PCT Pub. No.: WO2014/170729
PCT Pub. Date: Oct. 23, 2014

(65) Prior Publication Data
US 2016/0052822 A1    Feb. 25, 2016

(30) Foreign Application Priority Data

Apr. 15, 2013  (AT) .................................. A 307/2013

(51) Int. Cl.
C04B 7/43     (2006.01)
C04B 7/47     (2006.01)

(52) U.S. Cl.
CPC ................ C04B 7/432 (2013.01); C04B 7/43 (2013.01); C04B 7/475 (2013.01)

(58) Field of Classification Search
CPC ............ C04B 7/43; C04B 7/432; C04B 7/475
See application file for complete search history.

(56) References Cited

U.S. PATENT DOCUMENTS

| | | | |
|---|---|---|---|
| 4,298,383 A | 11/1981 | Brachthauser et al. | |
| 4,392,822 A * | 7/1983 | Brachthauser | C04B 7/43 373/1 |
| 2010/0146972 A1 * | 6/2010 | Sorita | C04B 7/47 60/653 |

OTHER PUBLICATIONS

International Search Report dated Aug. 5, 2014 in PCT/IB2014/000500.

* cited by examiner

*Primary Examiner* — Shuangyi Abu Ali
(74) *Attorney, Agent, or Firm* — Fitch, Even, Tabin & Flannery, LLP

(57) ABSTRACT

In a process for the production of cement clinker, in which raw meal is preheated in a preheater (3) using the hot exhaust gases from a clinker kiln, and the preheated raw meal, which is optionally calcined in a calciner (4), is burned to clinker in the clinker kiln (2), wherein the preheater (3) comprises at least one string of a plurality of cyclone suspension-type heat exchangers (8, 9, 10), through which the kiln exhaust gas successively flows and in which the raw meal is preheated in stages, a partial stream of the kiln exhaust gas is diverted such that only a remaining residual stream of the kiln exhaust gas is utilized for preheating the raw meal.

16 Claims, 2 Drawing Sheets

PROCESS AND DEVICE FOR CEMENT CLINKER PRODUCTION

CROSS-REFERENCE TO RELATED APPLICATIONS

This Application is a U.S. National Stage Application filed under 35 U.S.C. § 371 of International Application PCT/IB2014/000500, filed Apr. 8, 2014, designating the United States, which claims priority from Austria Patent Application A 307/2013, filed Apr. 15, 2013, the complete disclosures of which are hereby incorporated herein by reference in their entirety for all purposes.

The invention relates to a process for the production of cement clinker, in which raw meal is preheated in a preheater using the hot exhaust gases from a clinker kiln, and the preheated raw meal, which is optionally calcined in a calciner, is burned to clinker in the clinker kiln, wherein the preheater comprises at least one string of a plurality of cyclone suspension-type heat exchangers, through which the kiln exhaust gas successively flows and in which the raw meal is preheated in stages.

BACKGROUND

The invention further relates to a cement clinker production plant comprising a clinker kiln to whose output-side end a clinker cooler is connected and to whose feed-side end a preheater, and optionally a calciner, are connected, wherein the preheater comprises at least one string of a plurality of cyclone suspension-type heat exchangers, through which the kiln exhaust gas is able to successively flow along a flow path and in which the raw meal is preheated in stages.

In cement clinker production, raw meal is preheated, completely dried, calcined, burned to clinker, and subsequently cooled. Plants operated according to this drying procedure comprise a preheater comprised of cyclone suspension-type heat exchangers, a calciner, a tertiary air duct, a rotary kiln, and a clinker cooler. The energy required for the material conversion in this plant is provided by supplying fuel to the rotary kiln and to the calciner. The air heated in the clinker cooler is returned partially to the rotary kiln as so-called secondary air and partially to the calciner as so-called tertiary air. The exhaust gases of the rotary kiln are conducted to the calciner through a kiln feed chamber and a flow contraction provided thereabove, flow through the same, and are discharged into the preheater along with the exhaust gases produced in the calciner and consisting of smoke gas from the calciner fuel and $CO_2$.

The preheater is comprised of one or several strings, and each string comprises several heat exchanger stages each formed by a cyclone suspension-type heat exchanger. The dry cement raw meal is charged into the vertical tube of the uppermost heat exchanger, travels through the heat exchanger stages from top to bottom, and is conducted into the calciner from the second-lowermost heat exchanger stage. In the calciner, the hot raw meal is almost completely deacidified and, together with the exhaust gas from the calciner, flows into the lowermost heat exchanger stage, is separated there, is charged into the kiln feed chamber, and reaches the rotary kiln as hot meal through the former. The hot meal is burned to clinker in the rotary kiln by a sintering process.

The thermal energy contained in the calciner exhaust gas, of about 1.4 normal $m^3$/kg of clinker and 850 to 890° C. is stepwisely given off to the fresh raw meal in co-current heat exchange. With the number of heat exchanger stages increasing, the temperature of the exhaust gas will decrease, the thermal efficiency of the kiln plant will improve, and the heat exchanger tower will increase in size and costs. Typically, four to six such stages are built, the number of stages being primarily a function of the moisture contained in the raw material.

The useful heat contained in the exhaust gas from the clinker kiln and the calciner exceeds the absorptive power of the raw meal due to the usual quantitative ratio and the characteristic of the multi-stage heat exchange. The thermal energy available at the kiln gas exit from the preheater, therefore, still comprises a useful residual heat potential of about 1.5 normal $m^3$/kg of clinker of 290 to >350° C. This can be further utilized for drying raw materials and fuels as well as for other purposes, e.g. the conversion into electricity, outside the thermal process.

The kiln exhaust gas is drawn through the heat exchanger stages by the aid of an induced draught ventilator. Since, in doing so, the total amount of kiln exhaust gas is drawn through all of the heat exchanger stages, the fluidic cross sections of the heat exchanger stages are to be dimensioned as large as possible in order to minimize the pressure drop, and hence the power required by the air suction ventilator. This will, however, involve plant costs that are directly dependent on the size.

SUMMARY

The present invention, therefore, aims to further develop a process, and cement clinker production plant, of the initially defined kind to the effect that the plant costs will be reduced without having to take into account losses of the thermal efficiency of the kiln plant.

To solve this object, the invention in a process of the initially defined kind provides that a partial stream of the kiln exhaust gas is diverted such that only a remaining residual stream of the kiln exhaust gas is utilized for preheating the raw meal. As compared to conventional systems, the same amount of raw meal can thus be preheated using less kiln exhaust gas, or a larger amount of raw meal can be preheated using the same amount of kiln exhaust gas. This will result in relatively more heat being withdrawn from the remaining kiln exhaust gas residual stream used for preheating, and the temperature of the kiln exhaust gas being correspondingly lower after the final heat exchanger stage, i.e. when leaving the preheater. Thus, also the temperature gradient will increase over each heat exchanger stage. Due to the reduced amount of kiln exhaust gas drawn through all of the heat exchanger stages, the gas-conducting cross sections of the heat exchanger stages, and hence the construction costs as against an overall gas-amount design will possibly be reduced. The diverted partial stream not used for preheating, of the kiln exhaust gas will be available for thermal utilization at a temperature of 850 to 890° C., in particular if, as in correspondence with a preferred mode of procedure, the partial stream of the kiln exhaust gas is diverted after the first, i.e. lowermost, cyclone suspension-type heat exchanger, viewed in the flow direction of the kiln exhaust, gas. In this respect, the partial stream of the kiln exhaust gas is, in particular, diverted between the first and the second cyclone suspension-type heat exchangers, viewed in the flow direction of the kiln exhaust gas.

DETAILED DESCRIPTION

Figure 1:
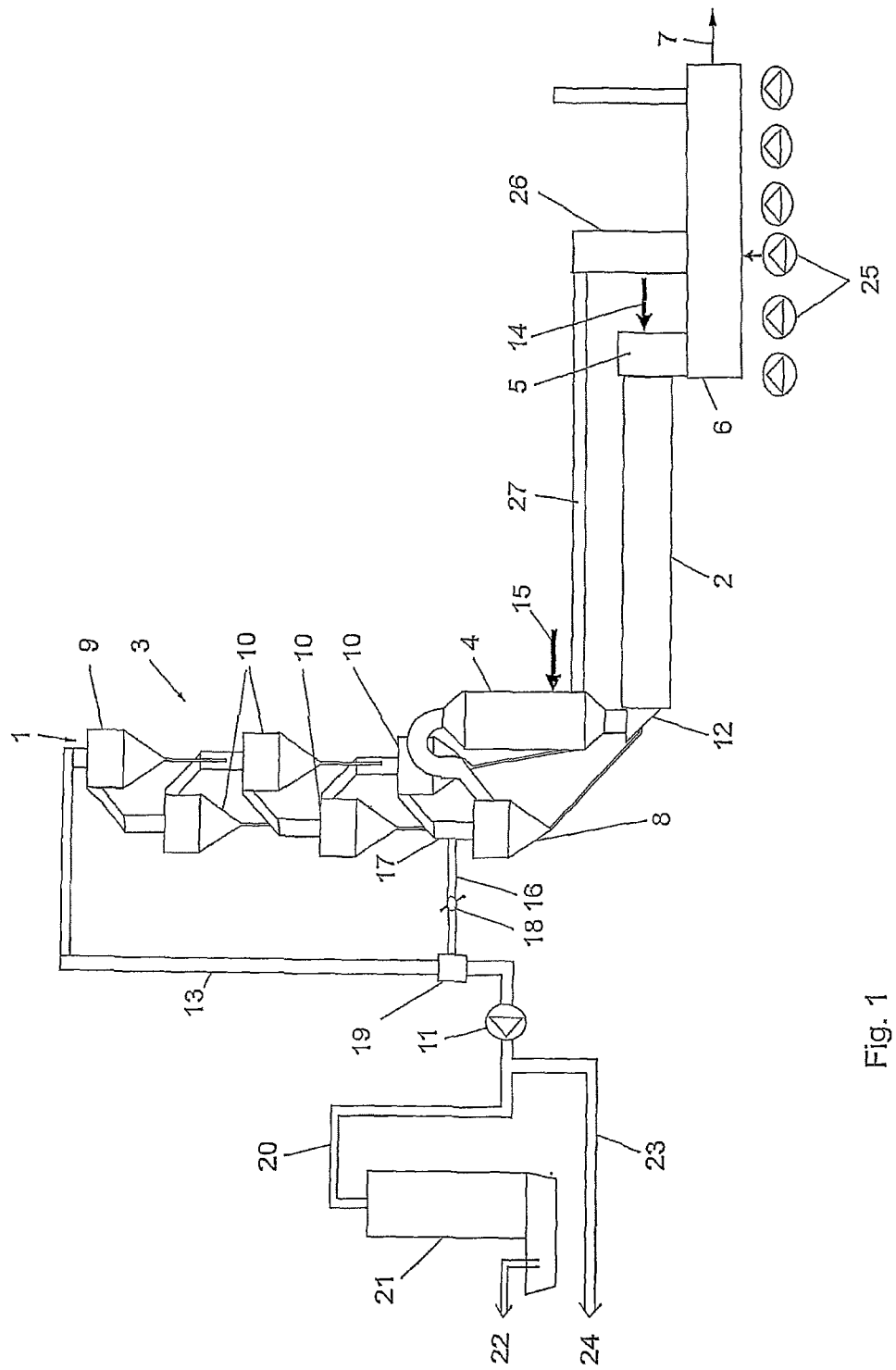
FIG. 1 depicts an embodiment of a cement clinker production plant.

In an embodiment of a process for the production of cement clinker, raw meal is preheated in a preheater using hot exhaust gases from a clinker kiln, and the preheated raw meal is burned to clinker in the clinker kiln, in which a partial stream of the clinker kiln exhaust gas is diverted such that only a remaining residual stream of the clinker kiln exhaust gas is utilized for preheating the raw meal and the preheater comprises at least one string of a plurality of cyclone suspension-type heat exchangers through which clinker kiln exhaust gas successively flows and the raw meal is preheated in stages.

Another embodiment pertains to a cement clinker production plant for carrying out a present process. In one of its aspects, such a cement clinker production plant comprises a clinker kiln having an output-side end; a clinker cooler connected to the output side; the clinker cooler having a feed-side end; a preheater; and optionally a calciner, wherein the preheater comprises at least one string of a plurality of cyclone suspension-type heat exchangers through which clinker kiln exhaust gas is able to successively flow along a flow path whereby the raw meal is preheated in stages, and it can include a branch duct for diverting a partial stream of clinker kiln exhaust gas from the flow path.

The size of the diverted partial stream can be selected as a function of the respective conditions with certain upper limits being set to safeguard the preservation of the overall thermal efficiency. It is, therefore, preferably provided that the volume ratio of the diverted partial stream and the remaining residual stream of the kiln exhaust gas is 1:99 to 40:60, preferably 10:90 to 30:70.

The invention is particularly advantageous for increasing the capacity of existing kiln plants, with the strongly increasing use of alternative fuels, and in some circumstances even for new installations. Another advantage resides in the separate outward transfer of useful heat at a substantially higher, and hence more valuable, temperature level of more than 850° C. instead of the 300 to 350° C. usually provided by the heat exchanger exhaust gas.

When increasing the efficiency of existing kiln plants, an expensive enlargement of the existing preheater can be avoided by the diversion of a high-temperature partial gas stream, which will, moreover, also reduce to some days the interruption of operation of several weeks. It will merely do to retrofit the gas diversion and the installations connected thereto, such as the mixing cyclone, hot-gas valves and blowers.

By the invention, it has, moreover, become possible to gain control of the problem of what is called AFR surcharge in the dimensioning of heat exchangers, and of the increased investment costs involved. The AFR surcharge is linked to the use of alternative fuels (alternative fuels and raw materials—AFR) and means that the heat exchanger stages will have to be dimensioned larger when reconstructing preheaters, if the plant is to be operated efficiently also with the use of alternative fuels. The diversion according to the invention, of a partial stream of the kiln exhaust gases allows for the avoidance of said AFR surcharge, since the amount of kiln exhaust gases drawn through the preheater will thus be kept constant, or not be increased.

The invention will also be of advantage if a newly designed kiln plant has to be frequently operated at a very low part load (<70%) over extended periods of time, for instance at strong fluctuations in demand. In such a case, the normally diverted partial stream can be cut off, and the amount of kiln exhaust gas flowing through the heat exchanger stages, and hence the gas speeds in the upper heat exchanger stages, can be kept at a normal and operationally safe level. However, the speeds in the calciner and in the lowermost heat exchanger stage will not be influenced, which will have to be taken into account in the design.

According to a preferred embodiment of the inventive procedure, the sensible heat of the diverted partial stream, and optionally of the residual stream, is utilized. Such utilization can be realized in various ways and as a function of the respective circumstances, wherein the thermal energy of the kiln exhaust gas can be supplied either to the clinker production process or to an external use. In a preferred manner, it is provided that the diverted partial stream of the kiln exhaust gas and the kiln exhaust gas drawn off the last cyclone suspension-type heat exchanger, viewed in the flow direction of the kiln exhaust gas, are mixed with each other. Thus, a high-temperature partial stream is mixed with a low-temperature gas stream and preferably used for raw material and/or fuel drying. The dried fuel and the dried raw material are preferably fed to the clinker production process. When the diverted high-temperature partial stream and low-temperature gas stream are mixed with each other, the operating temperature of the induced draught ventilator will remain on approximately the usual level, and a high-temperature blower can be obviated.

In a preferred manner, it is further provided that the diverted partial stream of the kiln gas and the kiln exhaust gas drawn off the last cyclone suspension-type heat exchanger, viewed in the flow direction of the kiln exhaust gas, are directly fed to a mixing device. This means that the diverted partial stream is directly transferred into the mixing device and no intermediately arranged units for utilizing the thermal energy are provided.

The mixing ratio of the diverted partial stream to the kiln exhaust gas drawn off the last cyclone suspension-type heat exchanger, viewed in the flow direction of the kiln exhaust gas, can preferably be selected such that the hot gas leaving the mixing device has a temperature of 400° C. to 550° C.

If no material drying is required, the diverted partial stream of the kiln exhaust gas can be very efficiently used thermally, for instance in a heat recovery steam generator, owing to its high temperature level of preferably >850° C.

To solve the object underlying the invention, it is contemplated according to a second aspect of the invention, in the cement clinker production plant of the initially defined kind, that a branch duct for diverting a partial stream of the kiln exhaust gas from the flow path is provided.

A preferred embodiment contemplates that the branch duct branches off the flow path after the first cyclone suspension-type heat exchanger, viewed in the flow direction of the kiln exhaust gas, wherein the branch duct, in particular, branches off the flow path between the first and the second cyclone suspension-type heat exchanger, viewed in the flow direction of the kiln exhaust gas.

A further preferred embodiment contemplates that a control organ, in particular a valve for adjusting the partial stream of the diverted kiln exhaust gas, is provided. Said control organ is preferably adjusted such that the volume ratio of the diverted partial stream and the remaining residual stream of the kiln exhaust gas amounts to 5:95 to 40:60, preferably 10:90 to 30:70.

A further preferred embodiment contemplates that the branch duct and a flue duct leading away from the last cyclone suspension-type heat exchanger, viewed in the flow direction of the kiln exhaust gas, are guided to a mixing device. The mixing device is preferably comprised of a mixing cyclone whose solids discharge for the separated hot meal is connected to the calciner or a raw meal charging or conveying device.

Another preferred embodiment contemplates that the kiln exhaust gas diverted via the branch duct, and optionally the kiln exhaust gas drawn off the last cyclone suspension-type heat exchanger, viewed in the flow direction of the kiln exhaust gas, are fed to thermal utilization. Such utilization, for instance, comprises raw material and/or fuel drying, wherein the dried fuel and/or the dried raw material are preferably fed to the clinker production process. Yet, such utilization may also comprise the generation of steam in a heat recovery boiler.

In the following, the invention will be explained in more detail by way of exemplary embodiments schematically illustrated in the drawing. Therein, FIG. 1 illustrates a first exemplary embodiment of a cement clinker production plant; and FIG. 2 illustrates a second exemplary embodiment of a cement clinker production plant.

Figure 2:
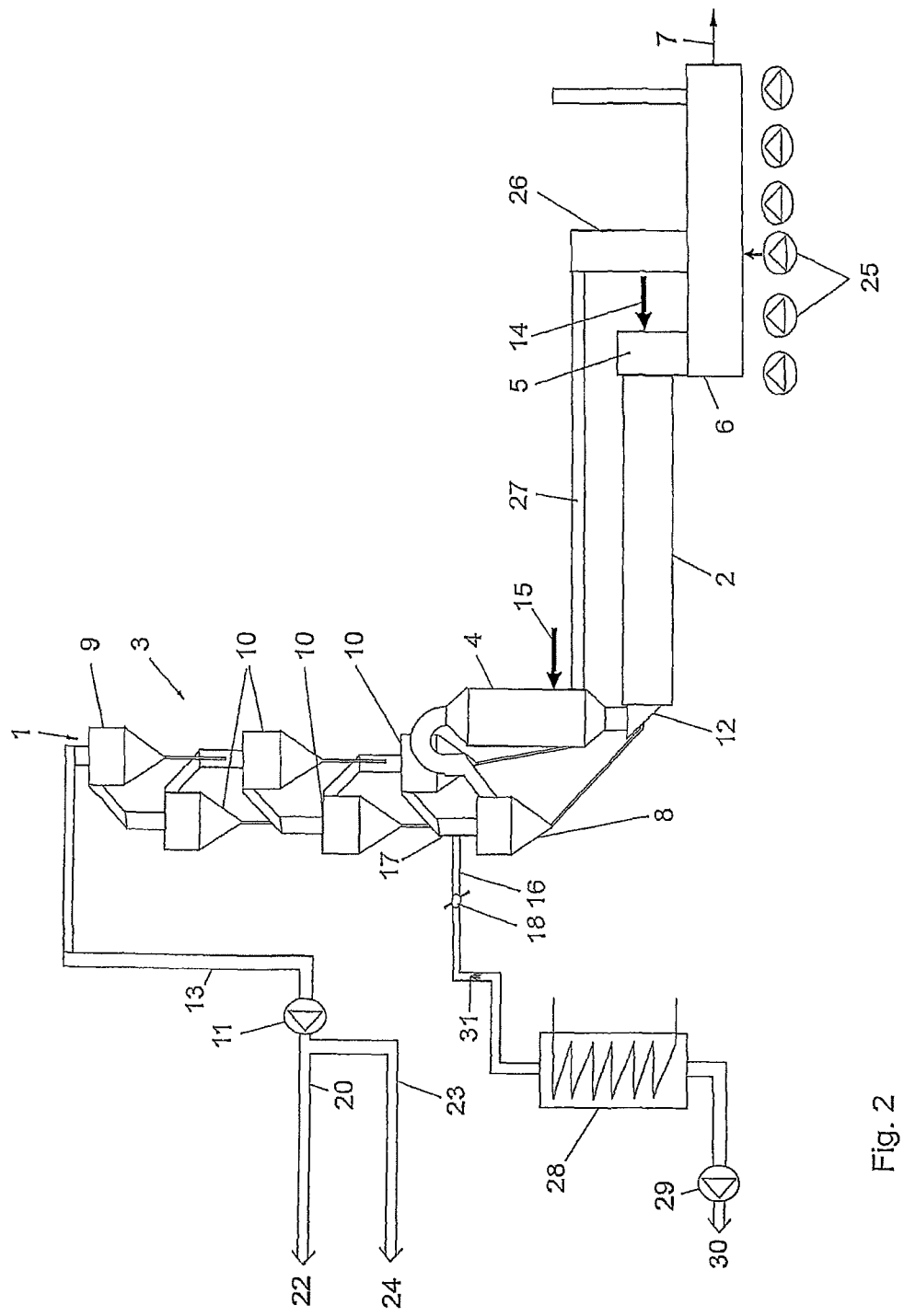
FIG. 2 depicts another embodiment of a cement clinker production plant.

FIG. 1 depicts a cement clinker production plant in which raw meal charged at a point schematically indicated by 1 is preheated in a preheater 3 in counter-current to the hot exhaust gases of a clinker kiln 2, and calcined in a calciner 4. Clinker leaves the clinker kiln 2 at a point denoted by 5 and is cooled in a clinker cooler 6. The cooled clinker leaves the clinker cooler 6 at the point denoted by 7.

The preheater 3 may comprise one or several preheater strings. In the drawing, one string is illustrated. The string comprises a plurality of consecutively arranged cyclone suspension-type heat exchangers, the first suspension-type heat exchanger being denoted by 8, the last suspension-type heat exchanger being denoted by 9, and the intermediately arranged suspension-type heat exchangers being denoted by 10. The kiln blower 11 creates the negative pressure required for drawing the kiln exhaust gas emerging on the hot-meal feed side 12 of the clinker kiln 2 through the calciner 4 and the consecutively arranged suspension-type heat exchangers 8, 10 and 9 as well as the hot-gas flue 13.

The firing system of the clinker kiln 2 is fed with fuel, as is schematically illustrated by 14. The fuel feed for the firing system of the calciner 4 is schematically indicated by 15.

The clinker cooler 6 comprises a plurality of blowers 25, via which ambient air is blown in. The air passes the clinker cooler 6 and leaves the clinker cooler 6 via the tertiary air vent 26 and the tertiary air channel 27, the tertiary air channel opening into the calciner 4.

In addition to the hot gas flue 13, kiln exhaust gas is also drawn via a branch duct 16. The branch-off point is located on the exit 17 of the first suspension-type heat exchanger 8. In the branch duct 16 is arranged a control organ comprised of a valve 18, which enables the adjustment of the amount of kiln exhaust gas drawn off. The kiln exhaust gas drawn off through branch duct 16 is fed to a mixing device 19, e.g. a mixing cyclone, in which the diverted partial amount of the kiln exhaust gas is mixed with the kiln exhaust gas residual stream drawn off via the hot gas flue 13 and drawn through the entire preheater 3. The raw meal is heated to temperatures of 700 to 900° C., in particular 850° C., in the calciner 4, the partial amount of kiln exhaust gas drawn off via the branch duct 16 consequently having a temperature of about 850° C. The residual amount of kiln exhaust gas, after having passed the preheater 3, has a temperature of 250 to 350° C., in particular 300° C., in the hot gas flue 13. The hot gas leaving the mixing device 19 has a temperature of 400 to 550° C. according to the volume ratio of the exhaust gas streams. The hot gas may then be supplied to a dedusting device 21 via a duct 20, and the dedusted hot gas may be fed to raw meal drying 22. Alternatively, or additionally, the hot gas can be fed, via a duct 23, to a coal mill 24 for drying the coal provided as fuel for the firing system 14.

The configuration according to FIG. 2 corresponds to the configuration according to FIG. 1, so that the same reference numerals have been used for identical parts. Deviating from FIG. 1, the kiln exhaust gas partial stream diverted via the branch duct 16 and the residual stream drawn off via the hot gas flue 13 are not mixed with each other, but are separately fed to a thermal utilization. The hot gas drawn off via the hot gas flue 13 is fed to raw meal drying 11 via duct 20. Alternatively, or additionally, the hot gas can be fed, via a duct 23, to a coal mill 24 for drying the coal provided as fuel for the firing system 14. Due to its substantially higher temperature of 800 to 900° C., the hot gas diverted via the branch duct 16 after coarse dedusting 31 can be fed to a heat recovery boiler 28 for generating steam. The cooled hot gas leaving the heat recovery boiler 28 will then be fed to further dedusting 30 via a blower 29.

The invention claimed is:

1. A process for the production of cement clinker comprising:
   preheating raw meal in a preheater using hot clinker kiln exhaust gas from a clinker kiln, wherein the preheater comprises at least one string of a plurality of cyclone suspension heat exchangers through which the hot clinker kiln exhaust gas successively flow and in which the raw meal is preheated in stages, and wherein the string of a plurality of cyclone suspension heat exchangers includes a first cyclone suspension heat exchanger and a last cyclone suspension heat exchanger,
   burning the preheated raw meal, which is optionally calcined in a calciner, to clinker in the clinker kiln,
   diverting a partial stream of the hot clinker kiln exhaust gas such that a remaining residual stream of the hot clinker kiln exhaust gas is utilized for preheating the raw meal,
   drawing off hot clinker kiln exhaust gas from the last cyclone suspension heat exchanger in the at least one string of the plurality of cyclone suspension heat exchangers, and
   mixing the diverted partial stream of the clinker kiln exhaust gas with the clinker kiln exhaust gas drawn off the last cyclone suspension heat exchanger, viewed in the flow direction of the clinker kiln exhaust gas.

2. A process according to claim 1, wherein said process further comprises diverting the partial stream of the clinker kiln exhaust gas after the first cyclone suspension heat exchanger, viewed in the flow direction of the kiln exhaust gas.

3. A process according to claim 2, wherein the at least one string of a plurality of cyclone suspension heat exchangers further comprises a second cyclone suspension heat exchanger and the partial stream of the clinker kiln exhaust gas is diverted so as to flow between the first and the second cyclone suspension heat exchangers, viewed in the flow direction of the kiln exhaust gas.

4. A process according to claim 1, wherein the mixing is at a volume ratio of the diverted partial stream and the remaining residual stream of the clinker kiln exhaust gas is of 1:99 to 40:60.

5. A process according to claim 1, wherein the process further comprises directly feeding the diverted partial stream of the clinker kiln exhaust gas and the clinker kiln exhaust gas drawn off the last cyclone suspension heat exchanger, viewed in the flow direction of the kiln exhaust gas, to a mixing device for mixing.

6. A process according to claim 5, wherein the process further comprises mixing the diverted partial stream of the clinker kiln exhaust gas and the clinker kiln exhaust gas drawn off the last cyclone suspension heat exchanger in a mixing ratio selected such that the hot gas leaving the mixing device has a temperature of 400° C. to 550° C.

7. A process according to claim 1, wherein the process further comprises utilizing sensible heat of the diverted partial stream, and optionally of the residual stream of the clinker kiln exhaust gas from the last cyclone separation heat exchanger.

8. A process according to claim 7, wherein the utilizing further comprises drying raw material and/or drying fuel, and the process further comprises feeding the dried raw material to the preheater and/or using the dried fuel in calcining or in the burning in the process for the production of cement clinker.

9. A process according to claim 7, wherein the utilizing comprises using the sensible heat in a heat recovery boiler to generate steam.

10. A process according to claim 7, wherein the utilization excludes the use in a drying unit for drying wet waste substances containing organic components, whose drier exhaust gases are fed the calciner.

11. A process for the production of cement clinker comprising:
preheating raw meal in a preheater with exhaust gas from a clinker kiln, wherein the preheater comprises at least one string of cyclone suspension heat exchangers comprising a first cyclone suspension heat exchanger, at least one intermediate cyclone suspension heat exchanger, and a last cyclone suspension heat exchanger in series, whereby the raw meal is preheated in stages;
optionally calcining the preheated raw meal;
feeding the preheated, and optionally calcined, raw meal to a clinker kiln, burning the preheated raw meal in the clinker kiln and generating clinker kiln exhaust gas;
drawing the clinker kiln exhaust gas, optionally initially through the calciner, through the first cyclone suspension heat exchanger;
separating the clinker kiln exhaust gases from the first cyclone separation heater into a diverted partial stream of clinker kiln exhaust gases and a residual portion of clinker kiln exhaust gas;
drawing the residual portion clinker kiln exhaust gas successively and counter-currently through the remaining cyclone suspension heat exchangers in the at least one string of cyclone suspension heat exchangers,
drawing off residual clinker kiln exhaust gas flowing from the last cyclone suspension heat exchanger, and
mixing the diverted partial stream of the clinker kiln exhaust gas with the residual portion clinker kiln exhaust gas drawn off from the last cyclone suspension heat exchanger to obtain a gas mixture.

12. The process according to claim 11, wherein said process further comprises calcining a portion of preheated raw meal to obtain a calcined product and feeding the calcined product to the clinker kiln.

13. The process according to claim 12, wherein said process further comprises feeding a portion of uncalcined preheated raw meal to the clinker kiln.

14. The process according to claim 11, wherein said process further comprises feeding uncalcined preheated raw meal to the clinker kiln.

15. The process according to claim 11, wherein the process further comprises drying raw meal with the gas mixture, and feeding the dried raw meal to the preheater.

16. The process according to claim 11, wherein the clinker kiln further comprises a firing system that uses fuel, and the process further comprises drying fuel, and using the dried fuel as fuel in the firing system.

* * * * *